United States Patent [19]

Song et al.

[11] Patent Number: 5,949,674
[45] Date of Patent: Sep. 7, 1999

[54] RECONSTRUCTION TOOL FOR EDITING DISTRIBUTED INDUSTRIAL CONTROLLER PROGRAMS

[75] Inventors: Yiping Song, Waukesha, Wis.; Robert J. Coppenhaver, Chagrin Falls, Ohio

[73] Assignee: Allen-Bradley Company, LLC, Milwaukee, Wis.

[21] Appl. No.: 08/963,782

[22] Filed: Nov. 4, 1997

[51] Int. Cl.⁶ .................................................. G05B 15/00
[52] U.S. Cl. ............................ 364/136; 364/137; 364/131
[58] Field of Search ............................ 364/136, 900, 364/188, 191, 131; 340/172.5

[56] References Cited

U.S. PATENT DOCUMENTS

| | | |
|---|---|---|
| 3,810,118 | 5/1974 | Kiffmeyer .................. 340/172.5 |
| 3,942,158 | 3/1976 | Dummermuth ............. 340/172.5 |
| 4,165,534 | 8/1979 | Dummermuth ............... 364/900 |
| 4,442,504 | 4/1984 | Dummermuth et al. ........ 364/900 |
| 5,452,201 | 9/1995 | Pieronek et al. ............. 364/188 |
| 5,504,902 | 4/1996 | McGrath et al. .............. 395/700 |
| 5,530,643 | 6/1996 | Hodorowski ................. 364/191 |
| 5,796,603 | 8/1998 | Hodorowski ................. 364/131 |

Primary Examiner—William Grant
Assistant Examiner—Victoria Robinson
Attorney, Agent, or Firm—Keith M. Baxter; John M. Miller; John J. Horn

[57] ABSTRACT

A method of reconstructing a control program from portions of that program contained in distributed processor modules of a distributed control system links each portion of the program with a source identifier. When the portions are collected, they are sorted by source identifier and merged to reveal the original control program as may be required for editing or the like.

8 Claims, 4 Drawing Sheets

RECONSTRUCTION TOOL FOR EDITING DISTRIBUTED INDUSTRIAL CONTROLLER PROGRAMS

CROSS-REFERENCE TO RELATED APPLICATIONS

STATEMENT REGARDING FEDERALLY SPONSORED RESEARCH OR DEVELOPMENT

BACKGROUND OF THE INVENTION

This invention relates to industrial control systems including programmable controllers and more particularly to a highly distributed industrial control system and a method for programming the same.

Industrial controllers such as those described in U.S. Pat. Nos.: 3,810,118; 3,942,158; 4,165,534; and 4,442,504 are specialized high speed computers that may be connected to industrial equipment, such as automated assembly lines or machine tools, to operate such equipment in accordance with a stored control program. The stored program includes instructions, which when executed, examine the conditions of selected inputs to the controller from sensing devices on the controlled equipment, or which energize or de-energize selected outputs connected to actuators on the controlled equipment.

The inputs and outputs to the industrial controller may be binary signals such as those from or to switches or solenoids, or may be analog signals describing process data values such as motion, temperature, time or other quantities. Analog signals are typically converted to digital form for processing by the industrial controller.

Industrial controllers may be programmed by means of special control oriented languages. A common language is "ladder logic" language in which the control program is represented graphically as ladders whose vertical rails are a virtual power source and power return and whose rungs are series and parallel connected virtual contacts and virtual relay coils. The contacts represent data values for example from inputs to the controller from the controlled machinery. The coils represent outputs to the controlled machinery. Advanced ladder logic languages also include arithmetic and other advanced commands represented graphically within the ladder logic program. Such controllers and languages are understood in the art.

In a centralized controller architecture, a single controller may communicate with one or more remotely located "I/O racks" communicating with the controller by means of a digital communication link. The I/O racks collect inputs and outputs from and to the controlled equipment and provide interface circuitry to handle different signal types.

For certain control applications, the single controller of the centralized control architecture may be augmented or supplemented by many separate processor modules each executing a portion of the control program in a distributed control architecture. Distributed processing can improve the response time of the industrial controller by providing effective parallel process and by reducing the time it takes for remote I/O racks to communicate with a central controller. Distributed processing may also reduce installation costs. U.S. Pat. Nos. 5,452,201 and 5,530,643, assigned to the assignee of the present invention and hereby incorporated by reference, describe a highly distributed industrial control system and a method of programming the distributed control system by dividing a control program among the various processor modules for independent execution.

In the process of distributing the control program among the processor modules, parts of the control program may be duplicated and sent to more than one processor module and logically connected sections of the control program may be broken apart and sent to different control modules based on considerations of processing capability, network traffic concerns, and efficiency in execution. Accordingly, the partitioned program may bear little resemblance to the originally written control program.

Unlike with a centralized control architecture where the control program is centrally located and may be easily displayed and edited with a distributed control system, there is no centralized repository of the unpartitioned control program. Although a copy of the pre-partitioned control program will normally be retained on the programming terminal used to partition the original control program among the various processor modules, that programming terminal may not be readily available. Further, in systems that allow editing of the program portions at the particular processor modules, the original control program may no longer be valid.

BRIEF SUMMARY OF THE INVENTION

The present invention provides a method of reconstructing a single, editable control program from the program portions allocated to processor modules in a distributed control system. The reconstructed program may then be reviewed and edited for reallocation to the processor modules.

Reconstruction of the control program is made possible by tagging the allocated program portions with a source identifier and including special junction instructions. The source identifier and the junction instructions guide the reconstruction process.

Specifically, the present invention provides a method of operating a distributed industrial controller. In the method, the control program is divided into portions and each portion assigned a source identifier reflecting the origin of the portion within the control program. When editing of the control program is required, the portions are collected at one site and reconstructed in accordance with the source identifiers to produce a single, editable control program. For ladder logic programs, the source identifier may be a rung number and the program broken into portions according to rungs.

Thus, it is one object of the invention to allow a control program to be divided among distributed processors in a distributed industrial controller and later reconstructed from the portions.

The dividing of the control program may produce a first and second portion having redundant instructions and assigned to different processor modules. This first and second portion are given the same source identifier and when the control program is reproduced, they are merged together at the redundant instructions.

Thus, it is another object of the invention to permit the reconstruction of a control program when portions of the control program are distributed redundantly among processor modules. Redundant allocation of program portions may improve the speed of execution of the industrial controller by allowing program portions changing an output on the controlled process to be grouped in one processor module with all program portions on which it depends.

The dividing of the control program may occur at a division point by inserting a first junction instruction prior to the division point. The first junction instruction causes the transmission on the communication link of a result value from the instructions of the first portion prior to the division point. A second junction instruction is inserted following the division point to operate on the result value and provide the result value to the other instructions of the second portion. After the first and second portions are sent to different processor modules, they may be collected again and the control program restored by merging the first and second portions at the division point identified by the first and second junction instructions.

Thus, it is another object of the invention to allow the restoration of the original control program when portions of the control program have been subdivided, for example, when a given processor module is not sufficiently powerful to execute all or particular instructions of the portion.

The method of the invention may include the additional step of assigning a sequence identifier to each portion related to the order of a branch of the control program comprising its source. Reconstructing the control program then reorders the branches according to the sequence identifiers.

Thus, it is another object of the invention to provide not simply a logical equivalent to the original control program but to provide a representation of the control program that looks like the original control program used to program the industrial control system. Generally the order of branches does not logically affect the control program but does change the way the control program is depicted.

The foregoing and other objects and advantages of the invention will appear from the following description. In this description reference is made to the accompanying drawings which form a part hereof and in which there is shown by way of illustration, a preferred embodiment of the invention. Such embodiment does not necessarily represent the full scope of the invention, however, and reference must be made therefore to the claims for interpreting the scope of the invention.

DETAILED DESCRIPTION OF THE INVENTION

Figure 1:
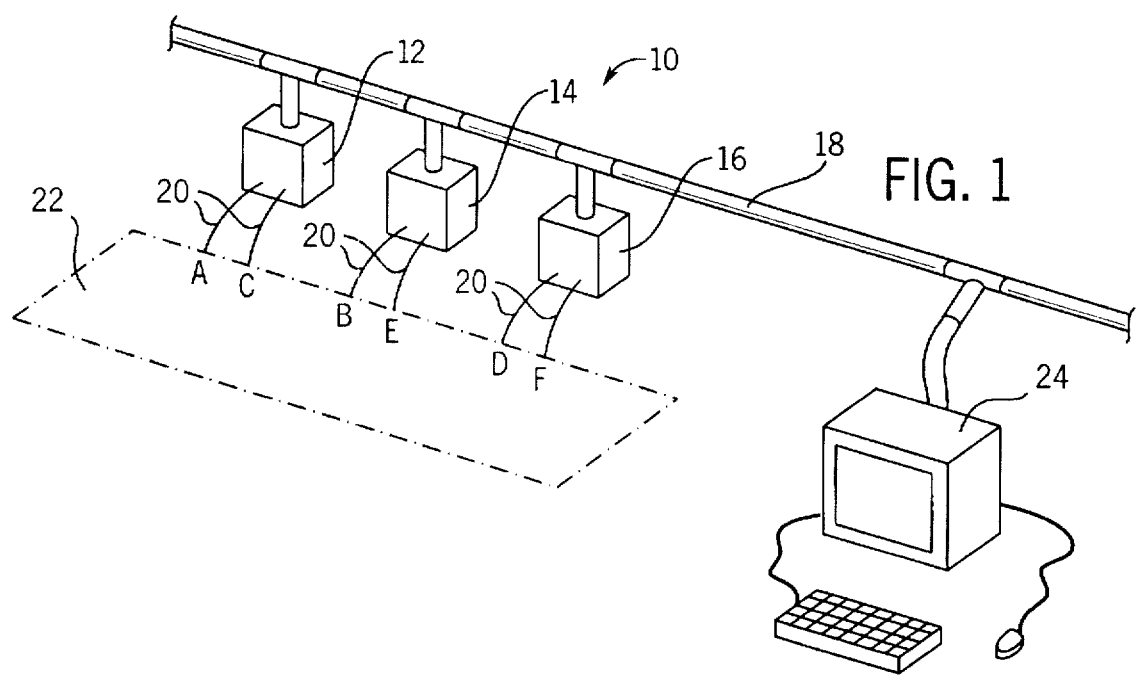
FIG. 1 is a perspective view of a simplified distributed control system having three processor modules communicating on a common communication link connected to an editing terminal.

Referring now to FIG. 1, a highly distributed control system 10 employs a number of processor modules 12, 14, and 16 having I/O lines 20 to a controlled process 22 and communicating on a shared communications link 18.

The I/O lines 20 may be either inputs or outputs, but as depicted are output lines communicating with control points on the control process 22 labeled A through F. Specifically, output I/O lines 20 from processor module 12 communicate with control points A and C, output I/O lines 20 for processor module 14 communicating with control points B and E, and output I/O lines 20 for processor module 16 communicating with control points D and F.

Also attached to the common communication link 18 is an editing terminal 24 such as a PC-style computer well known in the art. The editing terminal may be used to generate, display and edit a control program executed by the distributed control system in controlling the control process 22. Prior to execution, the control program is divided into control portions downloaded to each of the processor modules 12, 14, and 16.

Figure 2:
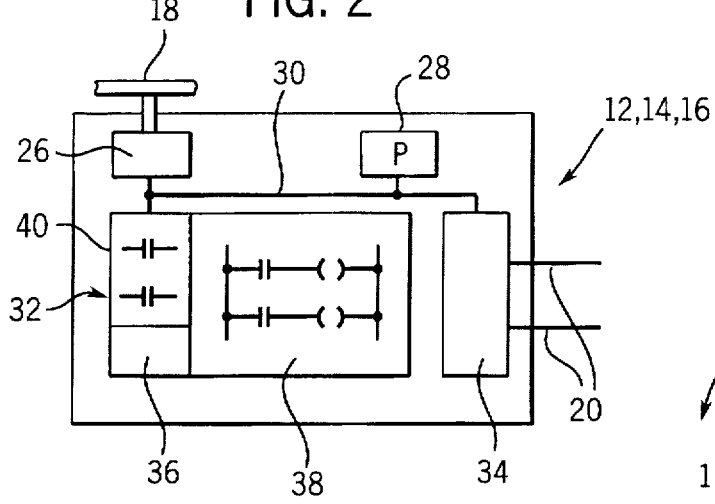
FIG. 2 is a block diagram of the processor modules of FIG. 1 showing an internal memory holding a portion of a control program for execution.

Referring now to FIG. 2, each of the processor modules 12, 14, and 16 include a link interface circuit 26 handling low level communication protocols with the link 18 such as will allow for the transmission of data between the processor modules 12, 14, and 16, during operation of the highly distributed control system 10 to control the process 22, and for the communication of the control program portions between the processor modules 12, 14, and 16 and the editing terminal 24. The link interface circuit 26 may be a controller area network (CAN) controller well known in the art or other similar type communication links may be used.

A microprocessor 28 within the processor modules 12, 14, and 16 connects to the link interface circuit 26 by an internal bus 30 which also connects to memory 32 and I/O circuitry 34, the latter which connects to I/O lines 20.

During operation, the memory 32 will contain an operating system program 36, a portion 38 of a control program to be executed by the particular processor module 12, 14, or 16 and a data table 40 holding data used by the portion 38. Under the guidance of operating system 36, the microprocessor executes the portion 38 reading and writing data of the data table 40.

Generally data of the data table 40 is from data received over link 18 from other processor modules 12, 14, and 16 or received via the I/O circuitry 34 from I/O lines 20 directly from the controlled process 22. During execution, the microprocessor 28 may develop additional values which are communicated via data table 40 to the link 18 to other processor modules 12, 14, or 16 or which are communicated to the controlled process 22 directly by the I/O circuitry 34 and I/O lines 20. The construction and operation of the processor modules 12, 14, and 16 in this regard reflects that of conventional controllers as will be understood to those of ordinary skill in the art.

The program portion 38 is originally downloaded from the editing terminal 24 as will be described. If it is desired to edit the control program, the microprocessor 28 may upload the program portion 38 back to the editing terminal 24. The operating system 36 permits the uploading, downloading, and execution of the program portion 38 over the link 18 according to techniques well understood in the art.

Generally, the processor modules 12, 14, and 16 do not have sufficient memory 32 or operating systems 36 to allow loading and editing of the entire control program represented by the portions 38 in each of the processor modules 12, 14, and 16.

Figure 3A:
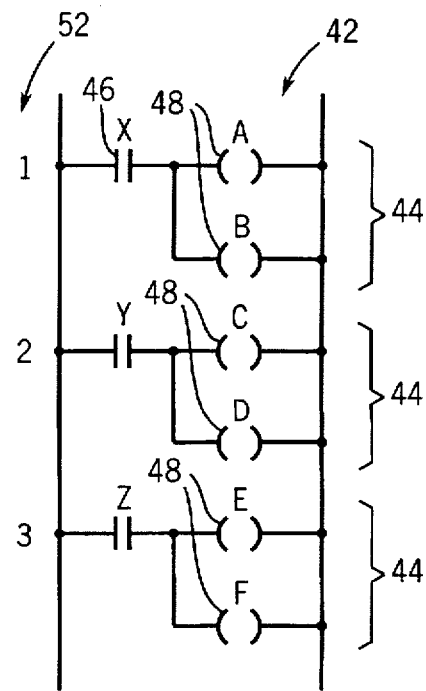
FIG. 3a is a graphic representation of a control program such as might be generated on the editing terminal of FIG. 1.

Referring now to FIGS. 1 and 3a, a control program 42 is shown such as might be displayed on the editing terminal 24 prior to its division into portions to be downloaded to the processor modules 12, 14, and 16. The control program 42 is written in ladder logic and include three rungs 44 each given a sequential and unique rung number 52. Each rung includes a series connected "contact" instructions 46 and "coil" instructions 48. Such instructions are well-known in the art and instruct the microprocessor 28 to test data values (in data table 40) represented by the contact instructions 46 and to write new data values (to data table 40) represented by the coil instructions 48 depending on the outcome of the test. The logic of the instructions is represented by branches in the interconnection between contact instructions 46 and coil instructions 48 and the entire control program 42 is executed one rung at a time in series.

As depicted, each rung 44 has a normally open contact instruction followed by a branch leading to two parallel connected coil instructions 48. The relevant data of the data table 40 on which the instruction operates is indicated by a letter above the symbol for the instruction. Accordingly, each of rungs 1, 2 and 3 test data values X, Y, and Z, respectively with their contact instructions 46. Rung 1 sets data values corresponding to control points A and B with its coil instructions 48, rung 2 sets data values corresponding to control points C and D, and rung 3 sets data values corresponding to control points E and F.

In the simplest case, individual rungs 44 may be allocated to particular ones of the processor modules 12, 14, and 16. At the time of this allocation, the rung number 52 for each allocated rung 44 is attached, as a source identifier, to the rung 44 and downloaded to one of the processor modules 12, 14, and 16 to become the program portions 38 for those processor modules.

At a latter time, if it is desired to edit the control program 42, the rungs 44 may be collected together by uploading them to the editing terminal 24 from the processor modules 12, 14, and 16. For this simple example, they may be reassembled, in order, by the order indicated by the source identifiers of the rung numbers 52 into control program 42 shown in FIG. 3a. This reconstructed control program 42 may be displayed on editing terminal 24, edited and downloaded again to the processor modules 12, 14, and 16 for execution. As will be described below, however, even in programs where the order of the rungs is not critical, a source identifier serves to collect rung portions 38 together (when individual rungs are divided) for the merger into the original rungs.

Figure 3B:
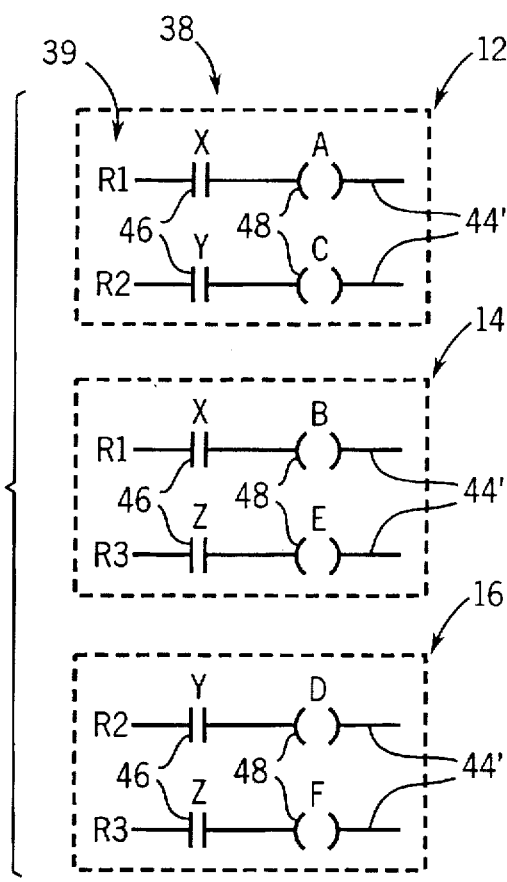
FIG. 3b is a figure similar to that of FIG. 3a showing the division of the control program of FIG. 3a into portions for allocation to the various processor modules of FIG. 1.

Referring now to FIG. 3b, typically, a more sophisticated allocation routine will be used for dividing control program 42 into program portions 38 for processor modules 12, 14, and 16. One such allocation routine, described in U.S. Pat. No. 5,796,603, and hereby incorporated by reference, divides control program 42 so that coil instructions 48 are in the processor modules 12, 14, and 16 that have I/O lines 20 connected to the particular control point defined by the coil instruction 48. Thus, coil instruction 48 for control point A of process 22 would be assigned to processor module 12 which has I/O lines 20 connected to control point A.

As shown in FIG. 3b, following this technique, control program 42 may be partitioned by allocating coil instructions 48 for control points A and C to processor module 12, allocating coil instructions 48 for control points B and E to processor module 14, and allocating coil instructions 48 for control points E and F to processor module 16.

The contact instructions 46 needed to determine the values for coil instructions 48 thus allocated follow the allocation of the coil instructions 48. Accordingly, all instructions "upstream" from the particular coil instructions 48 are collected and allocated to the processor module 12, 14, or 16 receiving the particular coil instructions 48.

In this way, processor module 12 receives as a program portion 38, contact instruction 46 for data value X, forming a rung 44' in series with coil instructions 48, and contact instruction 46 for data value Y forms a rung 44' in series with coil instruction 48 for data value corresponding to control point C. Each of the rungs 44' for this program portion 38 are tagged with a source identifier 39 based on the rung number 52 of the original control program 42 from which the program portion 38 is derived. Thus, the rung 44' with coil instruction 48 for control point A is tagged with R1 indicating that it is from the rung 44 of control program 42 having a rung number 52 of 1. The rung 44' with coil instruction 48 for control point C is tagged with R2 indicating that it is from rung 44 having a rung number 52 of 2.

Likewise, processor module 14 receives two rungs 44' as the program portion 38, the first tagged R1 and being the series connection of contact instruction 46 for data value X and coil instruction 48 for control point B, and the second tagged R3 being the series connection of contact instruction 46 for data value Z in series with coil instruction 48 for control point E. For processor module 16, the program portion 38 includes a rung tagged R2 with contact instruction 46 for data value Y in series with coil instruction 48 for control point D, and a rung tagged R3 with instruction contact for data value Z in series with coil instruction 48 for control point F.

Note that this allocation duplicates instructions in different processor modules 12, 14, and 16. For example, contact instructions 46 for data values X, Y, and Z are found in each of two processor modules 12, 14, and 16. Such an allocation can increase the speed of execution of the program on the highly distributed control system 10 by ensuring that all output instructions have the necessary input instructions on which they depend locally within the particular processor module 12, 14, and 16.

Reconstructing the control program 42 from the portions 38 shown in FIG. 3b involves the steps of loading those portions 38 into a central location such as the editing terminal 24 shown in FIG. 1, sorting the rungs 44' according to their tagged rung numbers, R1 through R3, and then merging the rungs for a given rung number together. In this case, the rungs tagged R1 shown in processor modules 12 and 14 would be merged at the common contact instruction 46 for data value X with a branch to the uncommon coil instructions 48 for control points A and B.

Figure 4A:
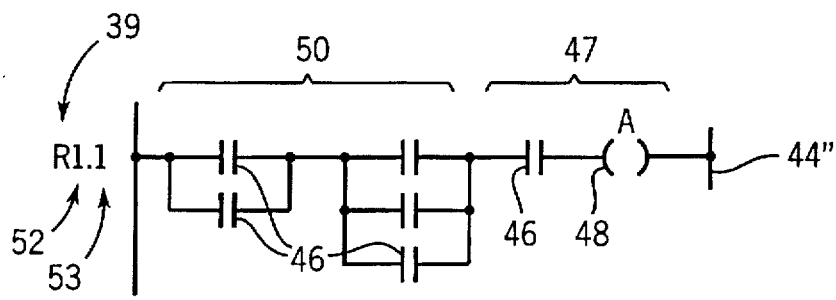
FIGS. 4a–4c are figures similar to FIG. 3b showing portions of a more complex control program allocated to processor modules of FIG. 1.
Figure 4B:
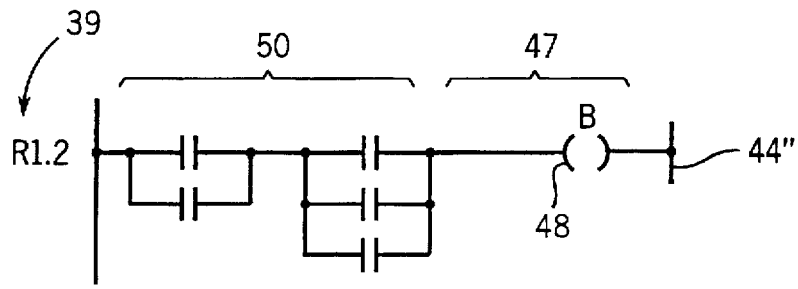
Figure 4C:
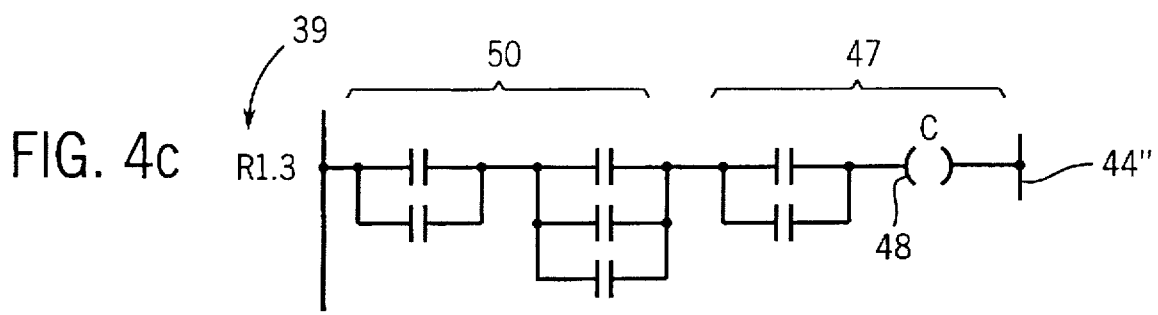

Referring now to FIGS. 4a through 4c, this process of collecting program portions 38, sorting them by their source identifiers 39, and merging them is shown for three rungs 44" having coil instructions 48 for control points A, B, and C, respectively. Each of these rungs 44" has a common rung prefix 50 represented by series and parallel combinations of various contact instructions 46, and a unique rung suffix 47 represented by the coil instruction 48 and for the rungs of FIGS. 4a and 4c by one or more contact instructions 46.

Figure 5:
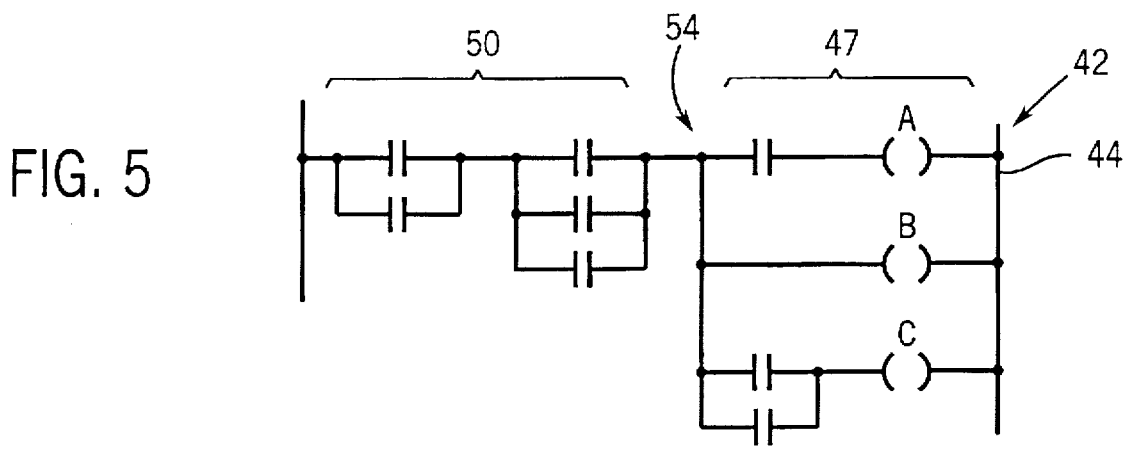
FIG. 5 is a figure similar to that of FIG. 3a showing a restored control program from the portions of FIGS. 4a–4c depicting the merger of identical preamble sections of the portions.

Referring to FIG. 5, merging of these rungs 44" creates a new rung having the common rung prefix 50 followed by a branch point 54 producing separate limbs for each of the unique rung suffix 47 of the rungs 44". The source identifiers 39 in this case include the rung number 52, but also a branch sequence identifier 53 indicated as the number following the decimal point in the source identifier 39. The branch sequence identifier 53 identifies the order within the original rung 44 of the branch of the rung 44" of the unique rung suffix 47.

Thus, the reconstructed rung 44 of FIG. 5 shows as the uppermost limb after branch point 54, the unique rung suffix 47 of the rung 44" of FIG. 4a per the branch sequence identifier 53 of 1. The next limb of the rung 44 in FIG. 5 derives from the unique rung suffix 47 of rung 44" of FIG. 4b as indicated by the branch sequence identifier 53 of 2. Finally, the last limb of the rung 44 in FIG. 5 derives from the unique rung suffix 47 of rung 44" of FIG. 4c as indicated by the branch sequence identifier 53 of 3.

The order of the limbs after branch point 54 does not affect the logic of the control program 42, but by correctly ordering the limbs of the branch, the reconstructed rung 44 looks like the original rung 44 improving the readability of the reconstructed control program 42 to the programmer who must perform maintenance or editing.

Figure 6A:
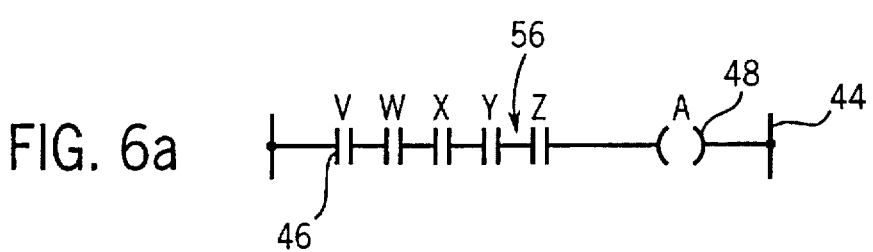
FIG. 6a is a figure similar to FIG. 3a showing a portion of a control program as would typically be allocable to a processor module.

Referring now to FIG. 6a, a rung need not be broken at a branch point 54, but may be broken at an arbitrary division point 56. In the example of FIG. 6a, division point 56 divides a rung with five series contact instructions 46 testing data values V through Z, respectively, and connected to a coil instruction 48 for control point A. The division point 56 is placed between contact instructions 46 for data values Y and Z but may, in general, be placed between any two groups of instructions. Such a division point 56 may be used where some of the instructions, for example instruction W, cannot be executed on the processor module 12, 14, or 16, to which coil instruction 48 would logically be assigned according to the partitioning method described above. Alternatively, there may exist a situation where the processor module 12, 14, or 16 to which coil instruction 48 will be assigned has insufficient memory to hold a rung having five contact instructions 46.

By breaking the rung at division point 56, part of the rung may be sent to one processor module 12, 14, or 16 and part of the rung may be sent to another processor module 12, 14, or 16.

Figure 6B:
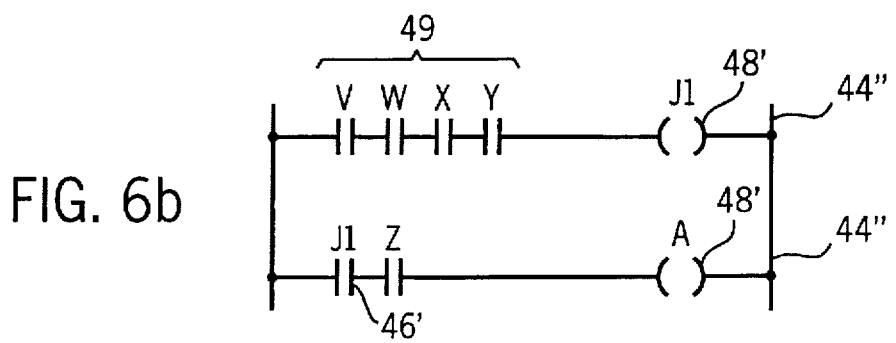
FIG. 6b shows a subdivision of the portion of FIG. 6a to permit the portion of 6a to be allocated among different processor modules.

As depicted in FIG. 6b, the breaking of the rung at division point 56 is performed by adding a special junction coil instruction 48' labeled J1 and not indicating a control point on the control process, but simply a data value J1 within the data table 40 of memory 32 shown in FIG. 2. A second partitionable rung 44" is then created having corresponding junction contact instruction 46' labeled J1 as well. Contact instructions 46 for data values V, W, X, and Y are connected in series to the junction coil instruction 48'. Junction contact instruction 46' and contact instruction 46 for data value Z are connected in series to the coil instruction 48 for control point A.

In this way two independently partitionable rungs 44" are created that are logically equivalent to the rung 44 of FIG. 6, but may be separately allocated to different processor modules 12, 14, or 16.

Figure 7:
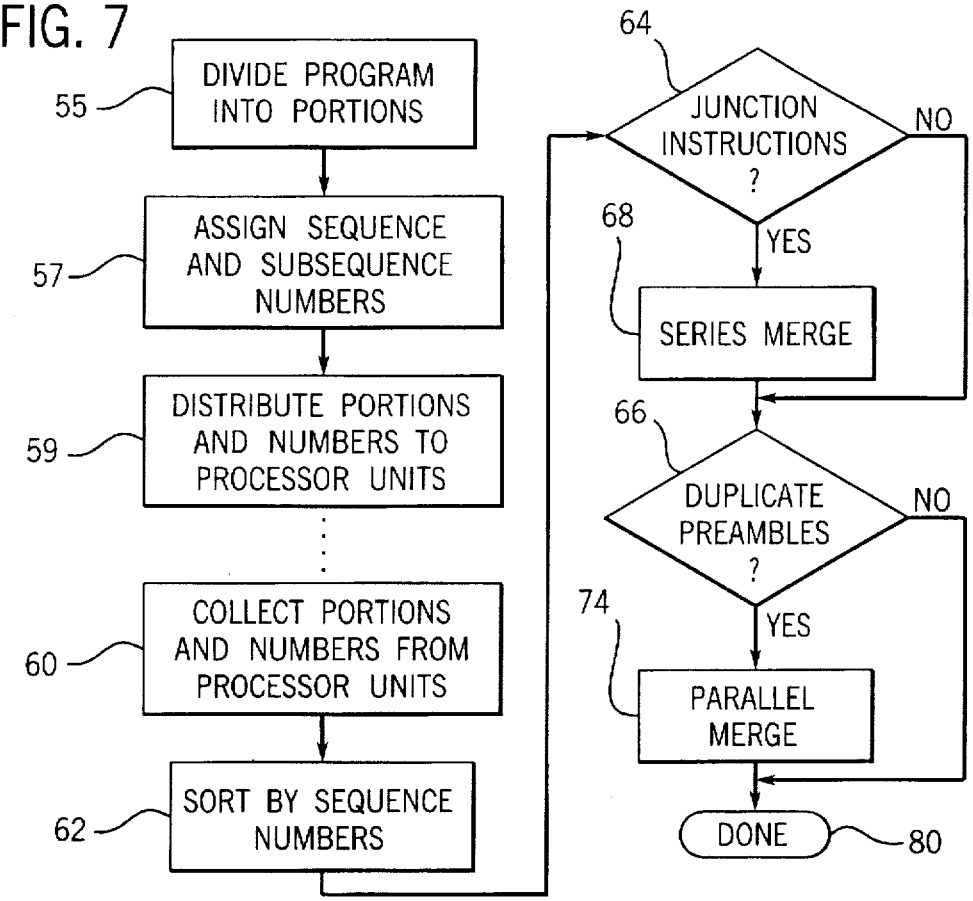
FIG. 7 is a flowchart of a program operating on the editing terminal shown in FIG. 1 such as may permit restoration of the control program from the portions allocated to the processor modules of FIG. 1.

Referring now to FIG. 7, the present method begins with the partition of the control program 42 into separate portions 38 to be allocated to ones of the processor modules 12, 14, and 16, as indicated by process block 55. This process may be performed by the editing terminal 24 executing a program operating on a complete copy of a control program 42. At succeeding process block 57, each portion is tagged with a source identifier 39 optionally including a branch sequence identifier 53. The portions are then distributed to the processor modules 12, 14, and 16, by downloading over the link 18, as has been described, indicated by process block 59.

In reconstructing the control program 42, the editing terminal 24 executing the stored program, collects the program portions 38 as indicated by process block 60.

The portions 38 are then sorted by their source identifiers 39, and, if present, by the branch sequence identifier 53 within the broader ordering of the source identifiers 39 as shown by process block 62.

At decision block 64, the portions 38 for each source identifier 39 are examined for junction instructions which are specifically identified as such by a data value name (e.g., J1) or memory location of the data value name in the data table 40. If there are no junction instructions, the program proceeds to process block 66; however, if there are junction instructions, the program proceeds to process block 68 and the preamble instructions 49 referred to in the discussion of FIG. 6b are substituted for the junction contact instruction 46' to merge the rungs 44" having the corresponding junction instructions.

The program executed by the editing terminal 24 then proceeds to process block 66 and the contact instructions 46 of all rungs 44" having a common source identifier 39 are examined, starting at the left-most instruction, that is the earliest one evaluated in time during actual operation of the program. If at decision block 66, a given corresponding pair of instructions are the same, then at process block 74 one such instruction is placed in a merged rung 44 to be formed and the program loops back to process block 66.

This cycle of process blocks 66 and 74 continues until a corresponding pair of instructions of the rungs 44" no longer match, this occurring at branch point 54 of FIG. 5, for example. At this time, at process block 74 a branch is inserted in the merged rung 44 and the three unique rung suffixes 47 of the portions 38, not matching per decision block 66 are placed in each of the branch positions according to a branch sequence identifier 53, if any.

If less than all of the portions 38 have the same contact instructions 46 at decision block 66, then those potions 38 having the same instructions are placed in a single branch formed by a process block 74 and the process of comparing instructions of block 66 and 74 is continued with respect to the matching portions 38 for as long as the instructions of those portions 38 continue to match. When instructions of additional portions 38 no longer match, process block 74 is again encountered and an additional branch is inserted for the unmatched portion, and so forth until at process block 74 all instructions have been evaluated in which case the program proceeds to exit block 80, the merging being complete.

Thus, the addition of a relatively compact source identifier allows reconstruction of the control program 42 from its constituent portions 38 as allocated among separate processor modules 12, 14, and 16. For ladder logic programming, the source identifier 39 need only be equal in range to the number of rungs in the program.

Figure 8:
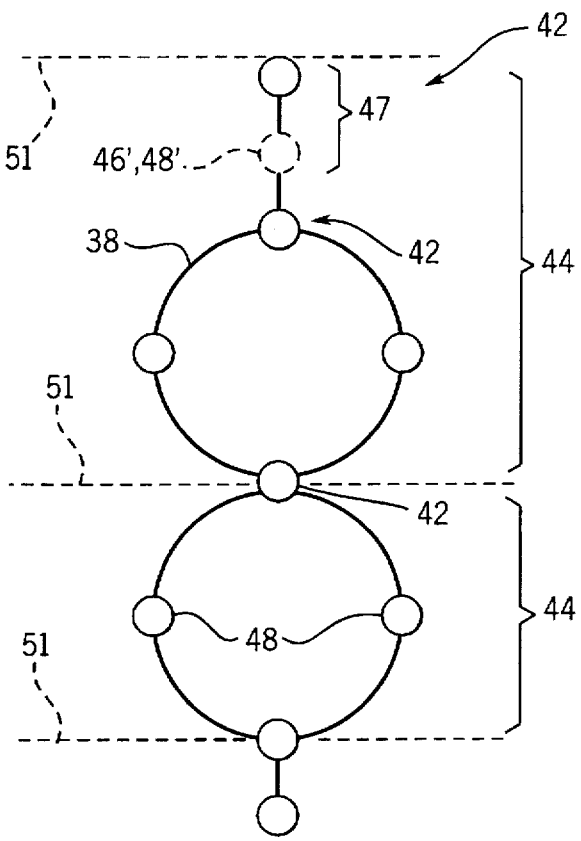
FIG. 8 is a graph showing flow of a generalized computer program showing natural lines of division of the control program into portions and various ways of allocating those portions.

The above description has been that of a preferred embodiment of the present invention. It will occur to those that practice the art that many modifications may be made without departing from the spirit and scope of the invention. For example, referring now to FIG. 8, the same technique can be used not simply for ladder logic programs, but for any program having points 51 at which all branches resolve themselves to a single node lending the program to allocation to different processors. In the graph of FIG. 8, circles represent operations performed by the program and lines represent branches in the flow of the program, normally depending on the outcome of test instructions, such as contact instructions 46.

During execution of a basic ladder logic control program 42, each rung 44 will be executed in strict sequence regardless of the execution of the prior rungs 44. Because inter-rung jumps are not allowed in basic ladder logic programming, all branches are resolved at the conclusion of each rung, at points 51. Accordingly, points 51 are natural points where the control program 42 may be divide into portions 38. Nevertheless, the graph of FIG. 8 and the present invention applies generally to any computer program having periodic points 51 of branch resolution. A count of points 51 provides a source identifier 39. A count of branches between points 51 (if any) provides a branch sequence identifier 53.

Generally a separate portion 38 will encompass each branch to a coil instruction 48 (that is one which writes to a variable). Between points 51, any program may be further divided as described above by inserting junction contact instructions 46' and coil instructions 48' into a portion of the graph between points 51.

In order to appraise the public of the various embodiments that may fall within the scope of the invention, the following claims are made.

We claim:

1. A method of operating a distributed industrial controller executing a control program of instructions to control an industrial process, the distributed industrial controller having a plurality of processor modules intercommunicating on a shared communications link to store and execute portions of the control program, the method comprising the steps of:

(i) dividing the control program into portions;

(ii) assigning each portion a source identifier reflecting the origin of the portion within the control program;

(iii) distributing the portions and source identifiers to the processor modules;

(iv) executing the portions at the processor modules to control the industrial process;

(v) collecting the portions at a singe site; and (vi) reconstructing the control program from the portions according to the source identifiers;

wherein:

step (i) divides the control program to produce at least one first and second portion having redundant instructions;

step (ii) assigns the first and second portion the same source identifier;

step (iii) distributes the first and second portions to different processor modules; and step (iv) merges the first and second portions according to their common source identifier.

2. The method of claim 1 wherein the control program is a ladder logic program having a series of rungs with contact instructions and coil instructions and wherein the portions are rungs of the ladder logic program and wherein the source identifier is a sequence number of the rung in the ladder logic program.

3. The method of claim 2 wherein the control program is a ladder logic program having a series of rungs with contact instructions and coil instructions and wherein the portions are rungs of the ladder logic program and wherein the first and second portions have some identical sequences of contact instructions and different coil instructions.

4. The method of claim 1 wherein the first and second portions are merged by:

(i) identifying identical sequences of instructions starting at the beginning of the portions according to execution order of the instructions: and (ii) creating a merged portion incorporating one copy of the identical sequence followed by branches to remaining instructions of the first and second portions following the identical sequences.

5. The method of claim 4 wherein:

step (ii) includes the additional step of assigning a sub-source identifier to each branch of a portion indicating its order in the control program; and step (iv) reorders the branches within a portion according to the sub-source identifier.

6. The method of claim 1 wherein:

step (i) divides the control program at a division point into a first and second portion by inserting a first junction instruction prior to the division point causing a transmission of a result value from instructions of the first portion prior to the division point on the communications link and a second junction instruction following the division point providing the result value to the other instructions of the second portion;

step (ii) assigns the first and second portion the same source identifier;

step (iii) distributes the first and second portions to different processor modules; and step (iv) merges the first and second portions by removing the first and second junction instructions and joining the first and second portions at the division point.

7. The method of claim 6 wherein the control program is a ladder logic program having a series of rungs with contact instructions and coil instructions and wherein the portions are rungs of the ladder logic program and wherein the first junction instruction is a coil instruction and the second junction instruction is a contact instruction testing the value of the coil instruction.

8. The method of claim 6 wherein the junction instructions are assigned instruction identifiers unique to junction instructions and wherein the first and second junction instruction are given a common instruction identifier.

* * * * *